US005209064A

United States Patent [19]

Noel et al.

[11] Patent Number: 5,209,064

[45] Date of Patent: May 11, 1993

[54] DEVICE FOR MUTUAL IMMOBILIZATION OF TWO ELEMENTS MOUNTED FOR RELATIVE ROTATION

[75] Inventors: Alain W. Noel, Verberte; Louis B. Bigo, Compiegne, both of France

[73] Assignee: Poclain Hydraulics, Verberie, France

[21] Appl. No.: 490,104

[22] Filed: Mar. 6, 1990

[30] Foreign Application Priority Data

Mar. 7, 1989 [FR] France ............................ 89 02985

[51] Int. Cl.[5] .............................. F16D 31/02

[52] U.S. Cl. .............................. 60/442; 91/45; 92/17; 92/27; 92/136; 92/165 PR

[58] Field of Search .................. 60/435, 442; 91/41, 91/44, 45, 491; 92/15, 17, 27, 136, 165 PR; 192/1.21, 148

[56] References Cited

U.S. PATENT DOCUMENTS

| | | | |
|---|---|---|---|
| 1,099,123 | 6/1914 | Fruehbeck | 60/435 |
| 1,112,627 | 10/1914 | Kneedler | 60/435 X |
| 2,275,640 | 3/1942 | Nardone | 92/136 X |
| 2,639,014 | 5/1953 | Munschaver | 92/133 |
| 2,742,991 | 4/1956 | Gilbert . | |
| 2,750,934 | 6/1956 | May | 92/136 |
| 3,913,454 | 10/1975 | Nelson | 91/491 |
| 4,114,737 | 9/1978 | Fukui | 192/3 N |
| 4,469,012 | 9/1984 | Bigo et al. | 91/491 |
| 4,571,941 | 2/1986 | Aoyagi | 60/435 X |
| 4,719,843 | 1/1988 | Noel | 92/491 X |
| 4,946,011 | 8/1990 | Oeynhansen | 60/435 X |
| 4,785,714 | 11/1988 | Tamada et al. | 91/491 |
| 4,898,076 | 2/1990 | Bigo et al. | 91/491 |
| 4,930,312 | 6/1990 | Metcalf | 60/435 |

FOREIGN PATENT DOCUMENTS

| | | |
|---|---|---|
| 2072364 | 11/1970 | France . |
| 2533965 | 12/1986 | France . |
| 676222 | 7/1952 | United Kingdom . |
| 746381 | 3/1956 | United Kingdom . |
| 856478 | 12/1960 | United Kingdom . |
| 2172677A | 9/1986 | United Kingdom . |

*Primary Examiner*—Edward K. Look
*Assistant Examiner*—Todd Mattingly
*Attorney, Agent, or Firm*—Skjerven, Morrill, MacPherson, Franklin & Friel

[57] ABSTRACT

This invention relates to an assembly of a hydraulic motor and a combined device for immobilization, comprising: a reaction cam; a cylinder-block mounted to rotate with respect to the reaction cam; a first immobilization member fast with the cylinder-block; a second immobilization member fast with the reaction cam and capable of being disposed in a first position, in which the first and second immobilization means are fast with one another, and a second position, in which these first and second immobilization members do not cooperate for their mutual immobilization. The device for adjusting the relative position of the first and second immobilization members comprising a jack comprising a chamber. According to the invention, a) one of the immobilization members is coupled to an immobilization device, mounted to move in translation on the element of the motor with which this immobilization member is fast; b) the immobilization device constitutes, with one of the elements defining the chamber of the jack, a monobloc assembly; c) one of the immobilization members comprises an immobilization catch capable of cooperating with a housing formed in the other immobilization member; and d) the first and second immobilization members are contained in the chamber. One application is the production of an axially compact, simple immobilization device.

11 Claims, 2 Drawing Sheets

DEVICE FOR MUTUAL IMMOBILIZATION OF TWO ELEMENTS MOUNTED FOR RELATIVE ROTATION

FIELD OF THE INVENTION

The present invention relates to a device for mutual immobilization of two elements mounted for relative rotation.

BACKGROUND OF THE INVENTION

Devices are already known for braking the rotation of two elements mounted for relative rotation, such as brakes, which allow the immobilization, with respect to rotation, of said elements.

Numerous known brakes are constituted by stacks of brake discs whose axial dimensions are large and whose cost is high.

SUMMARY OF THE INVENTION

It is an object of the present invention to overcome these drawbacks by proposing an assembly of a hydraulic motor and a combined device for immobilization. The device comprises a reaction cam; a cylinder-block mounted to rotate with respect to the reaction cam; a first immobilization means which is fast with respect to the rotation of the cylinder-block; a second immobilization means which is fast with respect to the rotation of the reaction cam and which is capable of being disposed with respect to said first immobilization means in two distinct positions. In a first position said first and second immobilization means are fast with one another with respect to rotation, and in a second position these first and second immobilization means do not cooperate for their mutual immobilization. Further included is a device for adjusting the relative position of the first and second immobilization means, coupled together and comprising in particular a pressurized fluid jack comprising a working chamber defined by a cylinder and by a piston mounted to slide therein.

According to the invention, the following arrangements are adopted: a) one of the first and second immobilization means is coupled to an immobilization member which is mounted to move in translation on two elements of the motor—the cylinder-block and reaction cam—with which said immobilization means is fast with respect to rotation; b) one of the elements defines a working chamber of a fluid jack including a piston and cylinder. The immobilization member constitutes a monobloc assembly; c) one of the first and second immobilization means is constituted by at least one immobilization catch capable of cooperating with at least one receiving housing formed in the other of said first and second immobilization means; and d) the first and second immobilization means are contained in the working chamber of the pressurized fluid jack.

The following advantageous arrangements are also preferably adopted.

A cylinder-block of the motor comprising a central bore is provided with splines intended in particular to render a drive shaft fast with said cylinder-block, with respect to rotation, said immobilization member is also provided with splines, which cooperate with the splines of the cylinder block in order to effect assembly of this immobilization member in translation with respect to the cylinder block and fast, with respect to rotation, with the cylinder-block.

The immobilization member and the piston of the jack constitute a monobloc assembly.

The first immobilization means and said piston constitute a monobloc assembly.

The second immobilization means and the cylinder constitute a monobloc assembly.

The first and second immobilization means include splines or frontal toothings.

The maximum diameter of the splines, or of the frontal toothings , which constitute a monobloc assembly with the piston, has a value close to that of the diameter of the piston.

The maximum diameter of the splines, or of the frontal toothings , forming a monobloc assembly with the piston, is between 0.88 and 0.96 times the diameter of the piston.

The principal advantage of the device described hereinbefore resides in the simultaneous obtaining of a simplicity of its constitution, a compactness and a desired efficiency. Saving of space which is particularly sought is especially obtained by means of the simple device.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
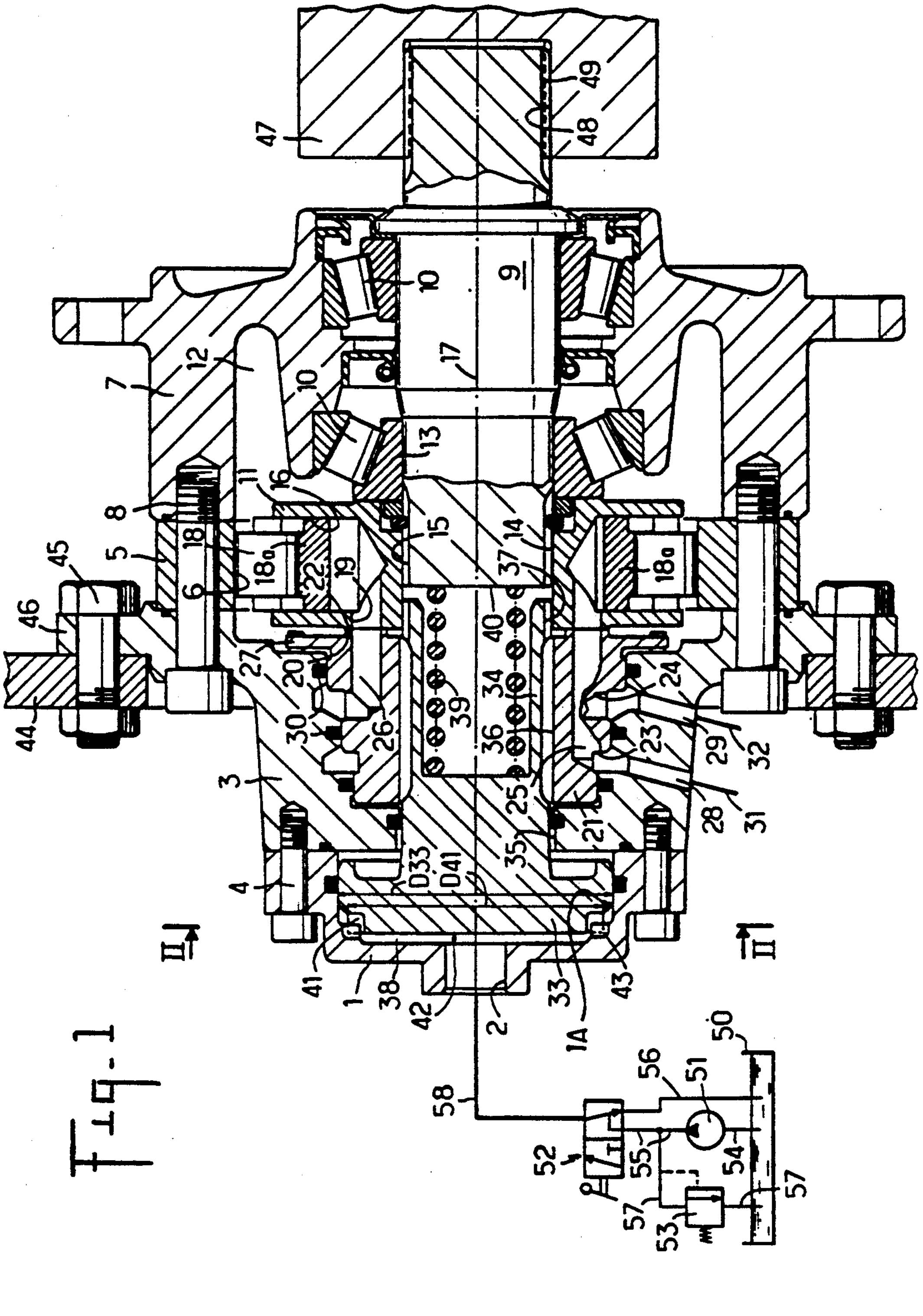
FIG. 1 shows a hydraulic motor and schematic operational system, the motor being provided with an immobilization device according to the invention.

Referring now to the drawings, FIG. 1 shows the assembly of a hydraulic motor and of an immobilization device adapted thereto. This assembly comprises a motor casing constituted by an end cover 1, provided with a joining element 2, a first intermediate part 3 on which the cover is attached by screws 4, a second intermediate part 5, in which is machined a multi-lobe cam 6, and by an end part 7. The first and second intermediate parts 3, 5 and the end part 7 are held in an assembly by screws 8. The casing defines an enclosure 12.

A driven shaft 9 is mounted to rotate with respect to the casing by means of two conical bearings 10. A cylinder-block 11 which is contained inside the enclosure 12, is in axial abutment on a bearing ring 13 of one of the conical bearings 10. The cylinder-block 11 includes central splines 14 cooperating with internal splines 15 on the driven shaft 9 so that the cylinder-block 11 is coupled to the driven shaft.

Cylinders 16 are disposed radially with respect to the axis of rotation 17 of the driven shaft 9. Each cylinder contains a piston **18*a* provided with a roller bearing 18 via which each piston 18*a* is capable of being in abutment on the cam 6, each cylinder and is in communication with a conduit 19 and has a flat face 20, perpendicular to the axis of rotation 17. The cylinder-block 11 is juxtaposed to a fluid distributor valve 21 having a flat face 22, perpendicular to the axis of rotation 17, in abutment with a flat face 20 of the cylinder-block 11. Two distinct grooves 23, 24** are isolated from each other by seal 30. Conduits 25 and 26 respectively connect to the flat face 22, so as to be able to communicate with the conduits 19 of the cylinder-block, successively. Notches and catches 27 act to immobilize, with respect to rotation, the fluid distributor valve 21 and the first intermediate intermediate part 3 of the casing. Two conduits 28 and 29 in first intermediate part 3 and respectively connect the grooves 23, 24 to external conduits 31, 32 for supply of pressurized fluid and exhaust of fluid.

Figure 2:
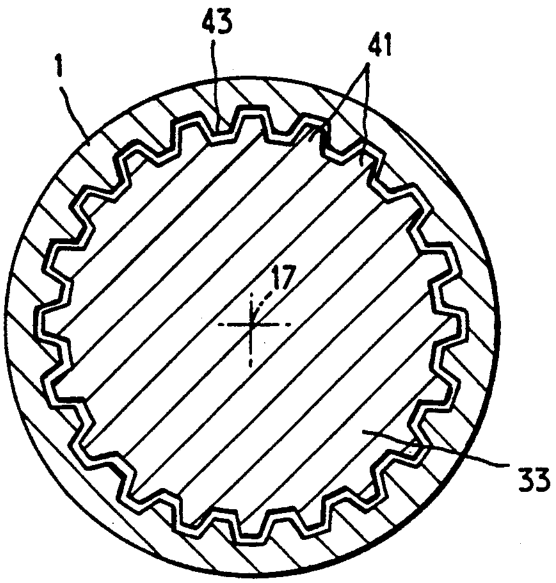
FIG. 2 is a cross-sectional view taken II—II of FIG. 1.

A cylindrical section 1A is provided in the cover 1. A piston 33, having an internal extension 34 passing through bore 35 in the first intermediate part 3 of the casing, and bore 36 in the fluid distributor valve 21. The piston is provided with splines 37, and is rendered fast in rotation with the cylinder-block 11 by the cooperation of said splines 37 of said extension 34 of the piston 33 and the splines 14 of the cylinder-block 11, said piston 33 being mounted to slide inside the cylindrical section. A fluid chamber 38 defined by the piston 33 and by the cylinder 1A, and communicates with the joining element 2 of the cover. A spring 39 is interposed between the internal end 40 of the driven shaft 9 and the piston 33 and its extension 34. Splines 41 are provided which open out in the face 42 of the piston defining the chamber 38 extend from the piston, and also open out on the periphery of the piston 33 and have a maximum diameter D41. Splines 43 are integrally formed in the internal face of the cover 1 and, as shown in FIGS. 1 and 2, cooperate with the splines 41 of the piston 33, in order to render fast in rotation the piston 33 and the cover 1 by their intermediary structure this immobilizes, with respect to rotation, the cylinder-block 11 and the casing parts (1-3-5-7).

It must be observed that the maximum diameter D 41 of the splines 41 has a value very close to that of the diameter D 33 of piston 33. In fact, D 41 has a value included between 0.88 and 0.96 times D 33 in the preferred embodiments. Furthermore, a body 44, such as the frame of a machine, may be rendered fast with the casing by means of bolts 45 and a flange 46 on the first intermediate part 3. A second body 47, such as the drive shaft of a device to be driven in rotation, is coupled in rotation with the driven shaft 9 by means of splines 48, 49 on that second body 47 and on the external part of the driven shaft 9.

The effect of spring 39 is to effect mutual penetration of splines 41 and 43 of piston 33 and cover 1, in the absence of pressurized fluid in chamber 38.

A circuit for adjusting the position of the piston 33 is provided, constituted by:

a fluid reservoir 50;

a hydraulic pump 51;

a two-way fluid distributor valve 52;

a calibrated discharge valve 53; and the following conduits:

suction conduit 54 connecting pump 51 to reservoir 50;

delivery conduit 55 of pump 51 connecting the latter to the fluid distributor valve 52;

conduit 56 connecting the fluid distributor valve 52 to the fluid reservoir 50;

conduit 57, which connects delivery conduit 55 to the fluid reservoir 50 and on which is disposed the discharge valve 53 for protection against excess pressures; and conduit 58, which connects the fluid distributor valve 52 to the joining element 2 of the cover 1.

The two positions of the fluid distributor valve 52 correspond as follows:

the first position, by the communication of conduits 58, 56 and 55, resulting in the immobilization of splines 41 by splines 43 and to a first end position of piston 33; and the second position, by the communication of conduits 55 and 58, to the obturation (closing) of conduit 56 and to a second end position of piston 33, splines 41 and 43 being disconnected with respect to one another.

Figure 4:
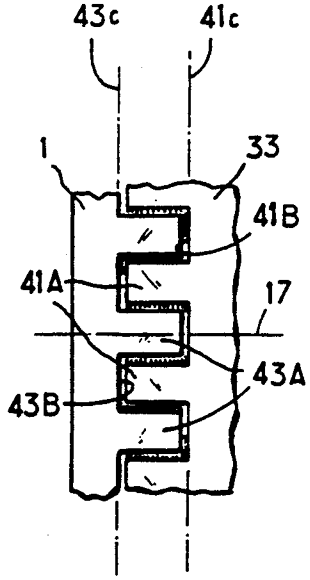
FIG. 4 is a segmental partial end view in the direction of arrow F of FIG. 3.
Figure 3:
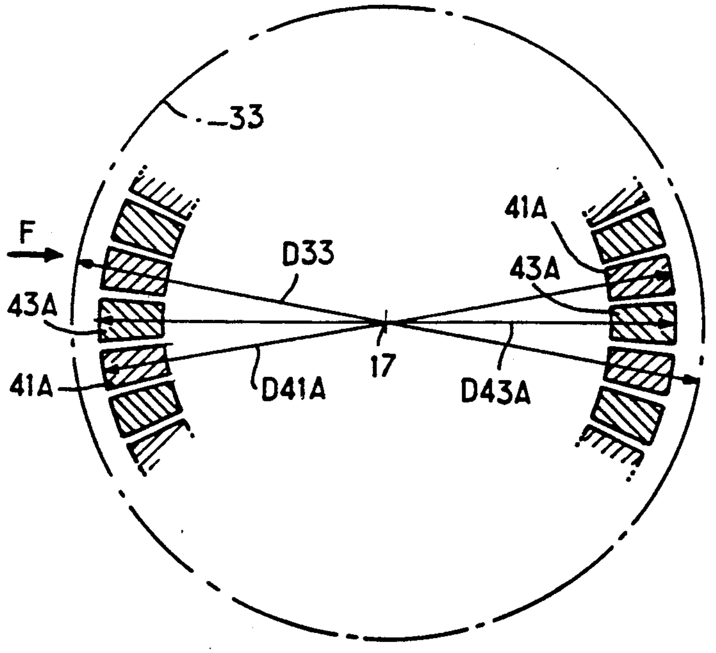
FIG. 3 is a transverse section, similar to that of FIG. 2, of a variant embodiment of the immobilization means, according to the invention.

As a variant to splines 41-43, the device may be provided with frontal toothings (FIGS. 3 and 4) of which the teeth 41A, 43A have their respective roots 41B, 43B contained in transverse planes 41C, 43C perpendicular to the axis of rotation 17, respectively. Naturally, the effect of connection of two elements, 41A, 43A, when they are imbricated (overlapped), is identical to that of splines 41, 43. In order to take optimum advantage of the volume place available, it is also often preferred to choose the maximum diameters D 41A and D 43A of said toothings to be as large as possible, for example between 0.88 and 0.96 times that, D 33, of piston 33.

Operation of the hydraulic motor is conventional and it is unnecessary to describe it here.

On the other hand, the operation of the immobilization device will be set forth hereinafter.

When the fluid distributor valve 52 is placed in its first position, either splines 41 and 43 are imbricated and spring 39 maintains them imbricated, or these splines are not yet imbricated, and a slight rotation corresponding at the most to the angle separating two splines will place splines 41 in position to be imbricated in splines 43, spring 39 in that case effecting such imbrication. When, from the position of mutual imbrication of splines 41 and 43, the fluid distributor valve 52 is placed in its second position, the pressurized fluid contained in chamber 38 and acting on piston 33, pushes this piston and ends imbrication of splines 41 and 43, with the result that the cylinder-block 11 and the driven shaft 9 may again rotate with respect to casing (1-3-5-7).

The advantages of the invention described hereinbefore resides in the simplicity of the device, in its compactness, particularly axial, in its low cost price.

It should be noted that the fact of having chosen to arrange the splines 41 of piston 33 on the periphery of the latter, allows, with a high value of D 41, a take-up of high torques, without difficulty. This is also valid for toothings 41A, 43A.

The invention is not limited to the embodiment described, but covers, on the contrary, all variants that may be made thereto without departing from its scope nor its spirit.

What is claimed is:

1. An assembly of a hydraulic motor and a combined device for immobilization, comprising:

a reaction cam;

a cylinder-block mounted to rotate with respect to the reaction cam;

a first immobilization means which is fast with respect to the rotation of the cylinder-block;

a second immobilization means which is fast with respect to the rotation of the reaction cam and which is capable of being disposed with respect to said first immobilization means in two distinct positions: a first position, in which said first and second immobilization means are fast with one another with respect to rotation, and a second position, in which these first and second immobilization means do not cooperate for their mutual immobilization; and a device for adjusting the relative position of the first and second immobilization means coupled together wherein said device comprises a pressurized fluid jack including a working chamber defined by a cylindrical section and by a piston mounted to slide therein; and wherein a) one of the first and second immobilization means is coupled to an immobilization member which is mounted to move in translation on the cylinder-block and the reaction cam elements of the motor, said reaction cam and said immobilization means being fast with respect to rotation;

b) said immobilization member and said cylinder-block defining the working chamber of said fluid jack;

c) one of the first and second immobilization means having at least one immobilization catch capable of cooperating with at least one receiving housing formed in the other of said first and second immobilization means; and d) the first and second immobilization means are contained in the working chamber of the pressurized fluid jack.

2. The assembly of claim 1, wherein the cylinder-block of the motor comprising a central bore provided with splines to render a drive shaft fast with said cylinder-block, with respect to rotation, said immobilization member also provided with splines, which cooperate with the splines of the cylinder-block in order to effect assembly of this immobilization member in translation with respect to the cylinder-block and fast, with respect to rotation, with the cylinder-block.

3. The assembly of claim 1, wherein the immobilization member and the piston of the jack constitute a monobloc assembly.

4. The immobilization assembly of claim 1, wherein said first immobilization means and said piston constitute a monobloc assembly.

5. The immobilization assembly of claim 1, wherein said second immobilization means and said cylinder constitute a monobloc assembly.

6. The immobilization assembly of claim 1, wherein the first and second immobilization means are constituted by splines.

7. The immobilization assembly of claim 6, wherein the maximum diameter of the splines which constitute a monobloc assembly with the piston, has a value close to that of the diameter of said piston.

8. The immobilization assembly of claim 7, wherein the maximum diameter of the splines forming a monobloc assembly with the piston, is included between 0.88 and 0.96 times the diameter of the piston.

9. The immobilization assembly of claim 1, wherein the first and second immobilization means are constituted by frontal toothings.

10. The immobilization assembly of claim 9, wherein the maximum diameter of the frontal toothings which constitute a monobloc assembly with the piston, has a value close to that of the diameter of said piston.

11. The immobilization assembly of claim 10, wherein the maximum diameter of the frontal toothings forming a monobloc assembly with the piston, is included between 0.88 and 0.96 times the diameter of the piston.

* * * * *

UNITED STATES PATENT AND TRADEMARK OFFICE
CERTIFICATE OF CORRECTION

PATENT NO. : 5,209,064

DATED : May 11, 1993

INVENTOR(S) : Alain W. Noel and Louis B. Bigo

It is certified that error appears in the above-identified patent and that said Letters Patent is hereby corrected as shown below:

Col. 2, line 27, after "a" insert --longitudinal cross sectional view of a--.

Col. 3, line 6, delete "intermediate".

Signed and Sealed this

Twenty-ninth Day of March, 1994

Attest:

BRUCE LEHMAN

Attesting Officer

Commissioner of Patents and Trademarks